(12) United States Patent
Christians

(10) Patent No.: US 9,341,075 B2
(45) Date of Patent: May 17, 2016

(54) PRE-TURBINE ENGINE CASE VARIABLE AREA MIXING PLANE

(75) Inventor: Joseph T. Christians, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 939 days.

(21) Appl. No.: 13/531,660

(22) Filed: Jun. 25, 2012

(65) Prior Publication Data

US 2013/0343866 A1    Dec. 26, 2013

(51) Int. Cl.

| | |
|---|---|
| *F02C 9/18* | (2006.01) |
| *F01D 17/14* | (2006.01) |
| *F02C 9/20* | (2006.01) |
| *F02K 3/075* | (2006.01) |
| *F02K 1/38* | (2006.01) |
| *F02K 3/11* | (2006.01) |
| *F01D 25/14* | (2006.01) |
| *F01D 25/30* | (2006.01) |

(52) U.S. Cl.
CPC .............. *F01D 17/141* (2013.01); *F01D 25/14* (2013.01); *F01D 25/30* (2013.01); *F02C 9/18* (2013.01); *F02C 9/20* (2013.01); *F02K 1/386* (2013.01); *F02K 3/075* (2013.01); *F02K 3/11* (2013.01); *Y02T 50/675* (2013.01)

(58) Field of Classification Search
CPC ..... F01D 17/14; F01D 17/141; F01D 17/143; F01D 25/14; F01D 25/24; F01D 25/26; F01D 25/28; F01D 25/30; F02C 9/18; F02C 9/20; F02K 3/11; F02K 1/386; F02K 3/075
USPC ............ 415/145, 166; 60/226.1, 226.3, 39.23
See application file for complete search history.

(56) References Cited

U.S. PATENT DOCUMENTS

| | | | | |
|---|---|---|---|---|
| 3,285,567 | A | * 11/1966 | Richardson | ........... F01D 17/162 415/148 |
| 4,010,608 | A | * 3/1977 | Simmons | ................ F02K 3/075 60/226.3 |
| 4,069,661 | A | * 1/1978 | Rundell | .................. F02K 3/075 60/204 |
| 4,072,008 | A | 2/1978 | Kenworthy et al. | |
| 4,203,285 | A | 5/1980 | Hanloser et al. | |
| 4,285,194 | A | 8/1981 | Nash | |
| 5,381,655 | A | 1/1995 | Orlando et al. | |
| 5,417,056 | A | 5/1995 | Johnson et al. | |
| 5,694,767 | A | 12/1997 | Vdoviak et al. | |
| 5,813,221 | A | 9/1998 | Geiser et al. | |
| 6,901,739 | B2 | 6/2005 | Christopherson | |
| 7,137,255 | B2 | 11/2006 | Schmotolocha et al. | |
| 7,395,657 | B2 | 7/2008 | Johnson | |
| 7,788,899 | B2 | 9/2010 | Smith | |
| 2010/0218483 | A1* | 9/2010 | Smith | .............................. 60/262 |

OTHER PUBLICATIONS

Patent Cooperation Treaty, International Search Report and Written Opinion, Aug. 27, 2013, 9 pages.

* cited by examiner

*Primary Examiner* — Christopher Verdier
(74) *Attorney, Agent, or Firm* — Kinney & Lange, P.A.

(57) ABSTRACT

A device for use with a gas turbine engine having an augmentor downstream includes a variable area mixing plane upstream of the turbine exhaust case for receiving core stream flow and fan stream flow. A swirl vane induces swirl in the fan stream flow and directs that stream flow to a mixing cavity to mix with the core stream and flow to the turbine exhaust case. A splitter proximate the swirl inducing vane diverts fan stream flow to an exhaust line to cool the fan case during operation of the augmentor.

19 Claims, 3 Drawing Sheets

PRE-TURBINE ENGINE CASE VARIABLE AREA MIXING PLANE

BACKGROUND

Gas turbine engines are being made more efficient as demand for high performance engines continues. Obtaining the best possible performance requires that the system have the ability to maintain adequate exhaust cooling while maximizing the momentum recovery of fan air, for thrust. Doing this is extremely important for achieving increased range while permitting efficient augmentation of the engine output when needed without heat damage to the engine case inner liner.

These engines operate in two modes, in some cases with both modes, in which, under augmentation, a fan stream is used to cool the engine fan case, and when the fan stream and the core stream are mixed with good pressure recovery. During thrust augmentation, fuel is added downstream of the engine itself in an augmentor or afterburner, which consumes a large amount of fuel and therefore is only used when a sudden boost in thrust is required.

SUMMARY

A variable area mixing device is located upstream of the turbine exhaust case in a gas turbine engine. A splitter is added to divert a portion of fan stream air flow to the exhaust liner to cool the liner during augmentation, where additional fuel is supplied to significantly increase thrust.

The mixing device introduces the fan stream just upstream of the turbine exhaust case where the core stream flow is also introduced. Fan air mixes with the core air to achieve minimum momentum loss. Swirl is introduced into the fan stream with a swirl inducing vane while the core stream passes through a vane and the last low pressure turbine blade. The mixed flow enters the turbine exhaust case using a variable area mixing plane. The variable area mixing plane is adjustable by varying degrees, not simply two positions, to provide sufficient liner flow while putting maximum possible fan flow to the turbine exhaust case.

DETAILED DESCRIPTION

Figure 1:
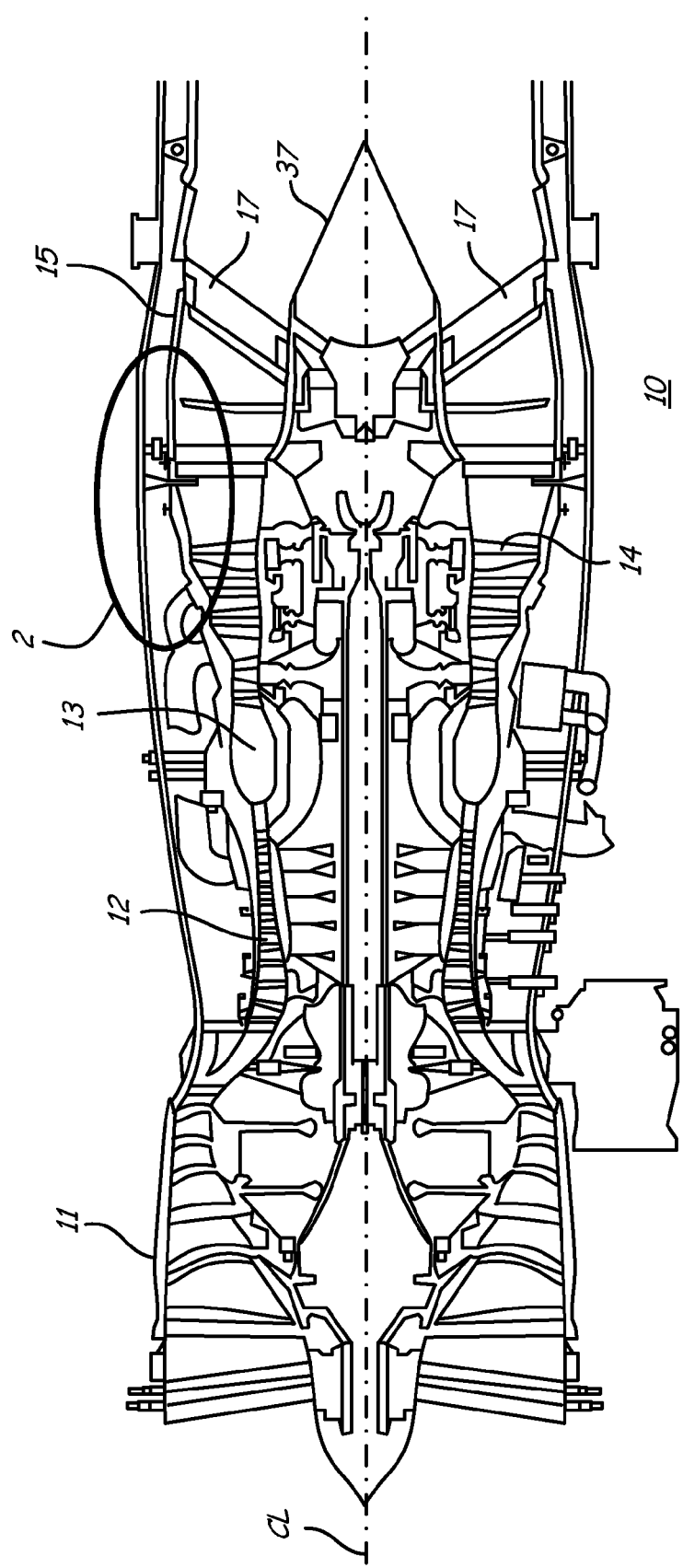
FIG. 1 is a section view of a gas turbine engine.
Figure 2:
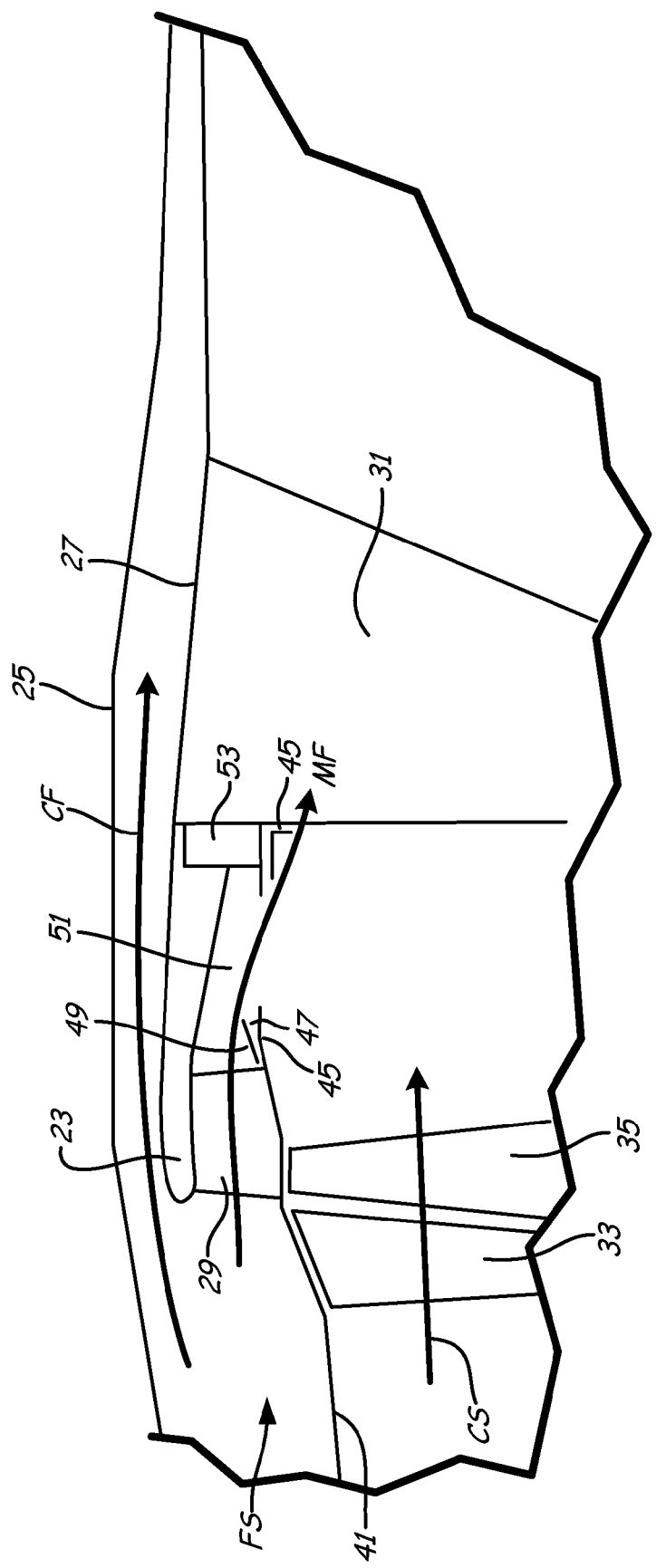
FIG. 2 is an enlarged, schematic view of area 2 shown in the circle of FIG. 1

The engine 10 in FIG. 1 is a gas turbine engines that includes fan 11, compressor 12, combustor 13, turbine 14, turbine exhaust case 15 and augmentation system 17. Augmentation system 17 (an afterburner) is used to add thrust when needed by adding fuel to the exhaust gases at that aft location. The present invention is suitable for any gas turbine engine, especially those which have an augmentation system that generates high heat during use. The invention is not limited to military aircraft, but it is noted that most often those aircraft use an augmentation system. Augmentation system 17 is a conventional system that adds up to about 50% thrust augmentation at takeoff under sea level static conditions. Afterburners add fuel to air that is exiting the turbine exhaust case. This exiting air has up to 75% of the original air input since only about 25% of the air passing through a turbojet engine (or 25% of the primary air passing through a turbo fan) is consumed by combustion. Keeping the afterburner surfaces cool is essential.

Engine 10 produces fan stream air flow FS from fan 11 and core stream air flow CS through compressor 12, combustor 13 and turbine 14. Fan stream air flow FS encounters splitter 23 which directs some of fan stream air flow FS on a bypass path cooling flow CF defined by outer fan case 25 and core engine case 27 when cooling is needed during use of the augmentor system 17. Augmentors infuse large amounts of fuel into the exhaust gas, creating a large thrust and generating high heat on the surrounding engine surfaces, such that if the surfaces are not cooled, they will be damaged. Augmentation may take place for five or ten minutes, or longer for example, when the aircraft is climbing or chasing another aircraft. This heat is controlled by fan stream air flow FS as it passes along path CF to the augmentation system surfaces.

When augmentor system 17 is not being used, all or most of fan stream air flow FS takes mixing path MF as it encounters swirl inducing vane 29 that causes fan stream FS to swirl into mixing cavity 31 where it mixes with core stream CS after core stream CS passes through the low pressure turbine vane 33 and low pressure turbine blade 35. The low pressure turbine section has a plurality of vanes and blades, and only the last stage vane 33 and blade 35 are shown. Core stream CS then mixes in mixing chamber 31 with swirling fan stream FS so that the two air flows mix with essentially minimal pressure drop and have minimized momentum loss, exiting the engine at exhaust 37 in FIG. 1, shown as a single nozzle at the back of the engine.

Figure 3:
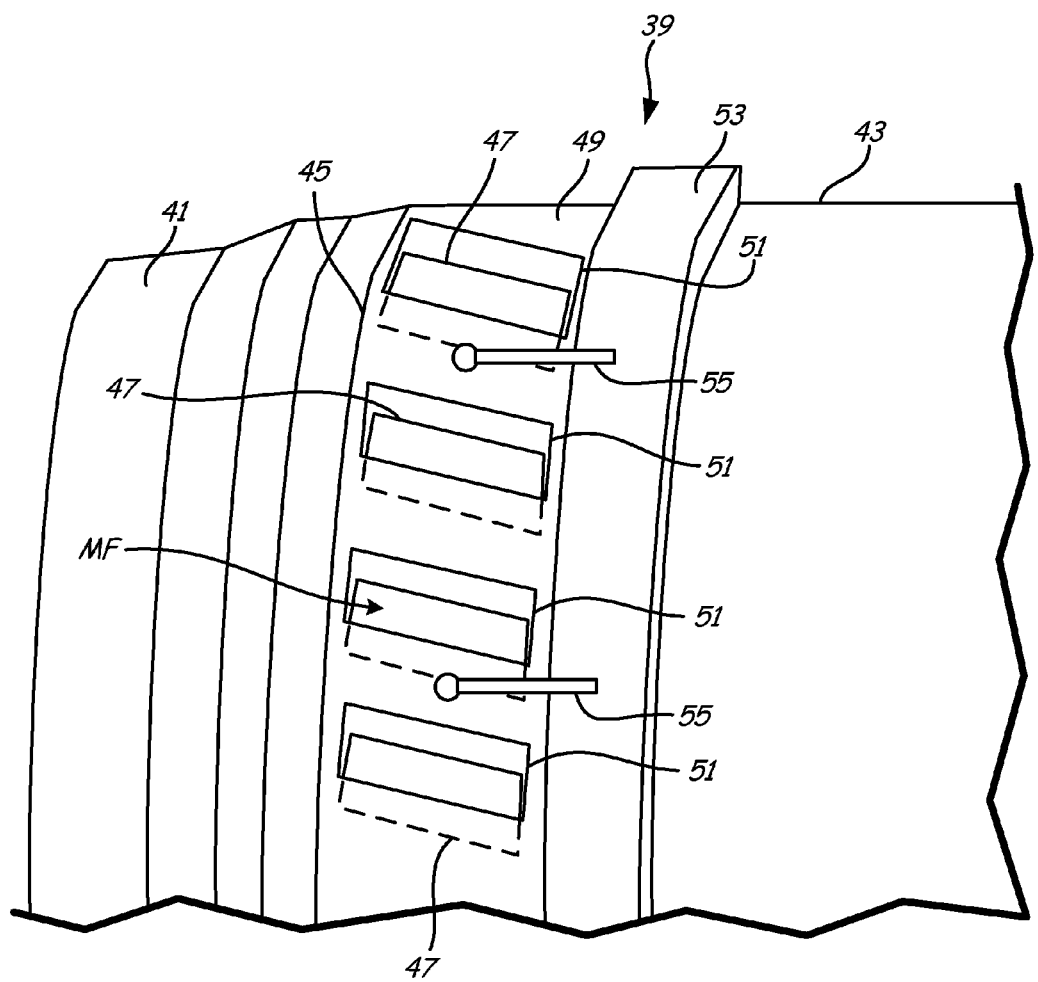
FIG. 3 is a further enlarged view of a component of the view of FIG. 2.

FIG. 3 illustrates a variable area mixing plane device 39 that is attached to the low pressure turbine case 41 at one end and at the outer diameter 43 of turbine exhaust case 15. Variable area mixing plane device 39 comprises a fixed inner cylinder 45 that has a plurality of gates 47 that can be closed, fully open, or partially open, depending on the volume of air flow needed. The amount of air passing through variable area mixing plane device 39 is adjusted to provide sufficient liner flow while putting maximum possible fan flow through to operate at maximum efficiency. Outer cylinder 49 is adapted to move circumferentially and has a plurality of gates 51 that cooperate with gates 47 of inner cylinder 45. Actuator crank 53 includes a plurality of actuator crank arms 55 that engage gates 47 to open or close them as needed by adjusting the relative position of gates 51 with respect to gates 47. FIG. 3 shows gates 47 and 51 partially aligned. Variable area mixing plane device 39 allows outer cylinder 49 to be rotated relative to fixed inner cylinder 45, opening or closing gates 47 and 51 to allow fan stream flow FS to mix with core stream flow CS to produce mixed flow MF. The lateral edges of gates are oriented to accommodate the swirl introduced by vane 29. Because variable area mixing plane device 39 is located upstream of turbine exhaust case 15, the gates can be adjusted to minimize momentum loss and thus produce optimum thrust. Thus the present invention permits maximum thrust during operation of the engine while also provided essential cooling when an augmentor is used.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A device for use with a gas turbine engine having a turbine exhaust case and a low pressure turbine case upstream from the turbine exhaust case, the device comprising:
   a variable area mixing plane device located upstream of the turbine exhaust case and downstream from the low pressure turbine case configured to selectively mix a core flow and a fan flow;
   a swirl inducing vane in the path of the fan flow for inducing swirl in the fan flow, the swirl inducing vane directing fan flow to a mixing cavity upstream of the turbine exhaust case;
   a core flow source for introducing the core flow into the mixing cavity to mix the core and fan flows and direct the mixed flow to the turbine exhaust case;
   an augmentor downstream of the turbine exhaust case, wherein the augmentor injects fuel into the mixed flow downstream from the turbine exhaust case;
   a duct having a substantially annular cross-section formed by a radially outward surface of a core engine case and a radially inward surface of an outer fan case concentric with the core engine case and the turbine exhaust case, wherein a portion of the duct is downstream from the augmentor; and
   a splitter mounted proximate the swirl inducing vane that divides the fan flow between the duct and an inlet to the variable area mixing plane device, wherein the flow within the duct cools the core engine case during operation of the augmentor.

2. The device of claim 1, wherein the mixed flow directed to the turbine exhaust case and the fan flow directed to the duct exit together through a nozzle at the back of the engine.

3. The device of claim 1, wherein the variable area mixing plane device includes a modulated exhaust cooling strap comprising an outer cylinder and an inner cylinder, the inner cylinder having a plurality of windows for passage of flow from the swirl inducing vane, and wherein the outer cylinder is moveably adjustable to control the fan flow through the plurality of windows.

4. The device of claim 3, wherein the outer cylinder includes an arm for each of the plurality of windows on the inner cylinder, the arms being positioned to open or close the plurality of windows by rotation of the outer cylinder with respect to the inner cylinder.

5. The device of claim 1, wherein the core flow is directed to the mixing cavity by a low pressure turbine blade upstream of the mixing cavity.

6. The device of claim 5, wherein the core flow exits the last low pressure turbine blade as a swirling flow that is not axial in flow.

7. A method for controlling the gas flow in a gas turbine engine having a turbine exhaust case, an augmentor downstream of the turbine exhaust case, and a low pressure turbine case upstream from the turbine exhaust case, the method comprising:
   receiving a core flow and a fan flow in a mixing cavity located upstream of the turbine exhaust case;
   controlling a ratio of the fan flow to the core flow within the mixing cavity with a variable area mixing plane device located upstream of the turbine exhaust case and downstream of the low pressure turbine case;
   inducing swirl in the fan flow with a swirl inducing vane in the path of the fan flow, the swirl inducing vane directing fan flow to the mixing cavity;
   introducing core flow into the mixing cavity from a core flow source to mix the core and the fan flows and to direct the mixed flow to the turbine exhaust case;
   using a splitter mounted proximate the swirl inducing vane to divide fan flow between a duct and an inlet of the variable area mixing plane device, wherein the duct is formed by the outer fan case and a core engine case; and
   using the fan flow directed to the duct to cool a portion of the core engine case downstream from the augmentor during operation of the augmentor, wherein operation of the augmentor includes:
   spraying fuel into the mixed flow downstream of the turbine exhaust case; and
   combusting the fuel before the mixed flow discharges from the gas turbine engine and along a portion of the core engine case cooled by the fan flow directed to the duct.

8. The method of claim 7, wherein the duct formed by the outer case includes an outer surface formed by the outer fan case and an inner surface formed by the core engine case.

9. The method of claim 7, wherein the mixed flow directed to the turbine exhaust case and the fan flow directed to the duct exit together through a nozzle at the back of the engine.

10. The method of claim 7, wherein the variable area mixing plane device includes a modulated exhaust cooling strap comprising an outer cylinder and an inner cylinder, the inner cylinder having a plurality of windows for passage of flow from the swirl inducing vane, and wherein the outer cylinder is moveably adjustable to control the amount of flow through the plurality of windows.

11. The method of claim 10, wherein the outer cylinder includes an arm for each of the plurality of windows on the inner cylinder, the arms being positioned to open or close the plurality of windows by rotation of the outer cylinder with respect to the inner cylinder.

12. The method of claim 7, wherein the core flow is directed to the mixing cavity by a low pressure turbine blade upstream of the mixing cavity.

13. The method of claim 12, wherein the core flow exits the last low pressure turbine blade as a swirling flow that is not axial in flow.

14. A system for controlling the gas flow in a gas turbine engine, the system comprising:
   a fan section for sending a core flow and a fan flow to an exhaust;
   a low pressure turbine positioned to receive the core flow from the fan section;
   a turbine exhaust case having an exhaust nozzle through which the core flow discharges from the gas turbine engine;
   a variable area mixing plane device located upstream of the turbine exhaust case and downstream of the low pressure turbine that is configured to selectively direct at least a portion of the fan flow into the core flow, thereby causing the fan flow to mix with the core flow;
   an augmentor downstream from the turbine exhaust case, wherein the augmentor is configured to add fuel to the gas flow downstream from the turbine exhaust case;
   a swirl inducing vane in the path of the fan flow and adjacent to an inlet of the variable area mixing plane device for inducing swirl in the fan flow, the swirl inducing vane directing fan flow to a mixing cavity upstream of the turbine exhaust case;
   a core flow source for introducing core flow into the mixing cavity to mix the core and fan flows and direct the mixed flow to the turbine exhaust case; and
   a splitter mounted proximate the swirl inducing vane for dividing the fan flow between a duct and the inlet of the variable area mixing plane device, wherein the duct is formed by an outer case and a core engine case, and wherein fan flow within the duct cools a portion of the core engine case downstream from the augmentor during operation of the augmentor.

15. The system of claim 14, wherein the duct formed by the outer case includes an outer surface formed by the outer fan case and an inner surface formed by the core engine case.

16. The system of claim 14, wherein the mixed flow directed to the turbine exhaust case and the fan flow directed to the duct exit together through a nozzle at the back of the engine.

17. The system of claim 14, wherein the variable area mixing plane device includes a modulated exhaust cooling strap comprising an outer cylinder and an inner cylinder, the inner cylinder having a plurality of windows for passage of flow from the swirl inducing vane, and wherein the outer cylinder is moveably adjustable to control the amount of flow through the plurality of windows.

18. The system of claim 17, wherein the outer cylinder includes an arm for each of the plurality of windows on the inner cylinder, the arms being positioned to open or close the plurality of windows by rotation of the outer cylinder with respect to the inner cylinder.

19. The system of claim 14, wherein the core flow is directed to the mixing cavity by a blade of the low pressure turbine upstream of the mixing cavity as a swirling flow that is not axial in flow.

* * * * *